Oct. 13, 1959 G. F. GREY 2,908,310
WELD NUT WITH WELDING PROJECTIONS HAVING TRANSVERSELY
AND LONGITUDINALLY CURVED SURFACES
Filed Oct. 27, 1955

INVENTOR.
GREGORY F. GREY

BY
Bosworth, Sessions
Herrstrom & Lawler
ATTORNEYS

United States Patent Office 2,908,310
Patented Oct. 13, 1959

2,908,310

WELD NUT WITH WELDING PROJECTIONS HAVING TRANSVERSELY AND LONGITUDINALLY CURVED SURFACES

Gregory F. Grey, Berea, Ohio, assignor to The Ohio Nut & Bolt Company, Berea, Ohio, a corporation of Ohio Application October 27, 1955, Serial No. 543,159

3 Claims. (Cl. 151—41.7)

This invention relates to fastening or attaching devices and more particularly to an improved form of weld nut which may be secured in position on a metal support member by electrical resistance welding.

In the metal fabricating art, particularly where relatively thin sheet metal parts are involved, so-called "weld nuts" are ued in large numbers for providing suitable threaded apertures, at the desired locations on the sheet metal part, in which correspondingly threaded screws or the like may be positioned. In a widely used type of weld nut a pilot portion projects from one face of the weld nut around the threaded opening therein and fits into a corresponding properly located hole in the support member, thereby serving to locate the nut on the supporting member prior to and during the welding operation. On such nuts welding projections are formed extending from the same face of the nut as the pilot but for a shorter distance so that the pilot will be effective to locate the nut prior to welding.

The present invention contemplates an improved form of weld nut which requires a minimum of stock, may be economically and rapidly produced by automatic machinery, and in which the welding projections are so formed and positioned that an effective bond is secured between the nut and the supporting member.

The above and other objects of my invention will appear from the following description of several embodiments thereof, reference being had to the accompanying drawings in which.

Figure 6:
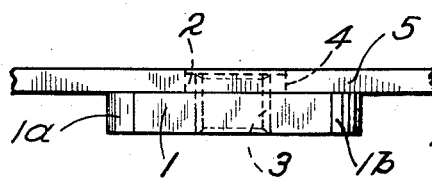
Figure 6 is a side elevational view showing the weld nut of Figure 1 secured to a supporting member by the usual welding operation.

Referring particularly to Figures 1-6, the weld nut illustrated comprises an elongated body member 1 from one face of which an annular pilot portion 2 projects. This pilot surrounds the threaded aperture 3 which extends through the body 1 and is centered on the longitudinal axis thereof midway between its ends 1$^a$ and 1$^b$. As seen in Figure 6, the pilot portion 2 extends into a corresponding hole 4 in the sheet metal supporting member 5 to which the nut is to be secured.

Figure 3:
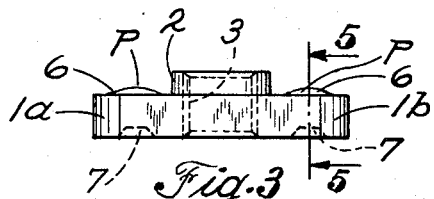
Figure 3 is a side elevation of the weld nut shown in Figures 1 and 2.
Figure 4:
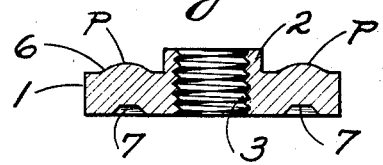
Figure 4 is a cross-sectional view taken substantially on line 4—4 of Figure 1.
Figure 5:
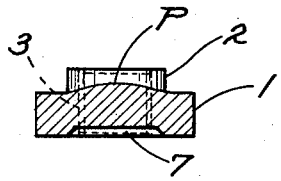
Figure 5 is a cross-sectional view taken substantially on line 5—5 of Figure 3.

Symmetrically disposed on opposite sides of the pilot portion 2 and extending transversely of the longitudinal axis of the elongated body portion 1 (which axis lies substantially on section line 4—4 of Figure 1) is a pair of elongated welding projections generally indicated at P. The longitudinal axes of these welding projections P are equidistant from the center of aperture 3 and extend substantially at right angles to the longitudinal axis of the nut body 1. As clearly seen in Figures 2 and 5, the outer surface of each projection P is curved in a longitudinal direction so that it is thickest at its center portion. Furthermore, as seen in Figures 3 and 4, the outer face of each of these projections P is also curved or rounded transversely of its longitudinal axes (it being understood that the longitudinal axes of the projections P extend in the direction of their greatest length).

Figure 1:
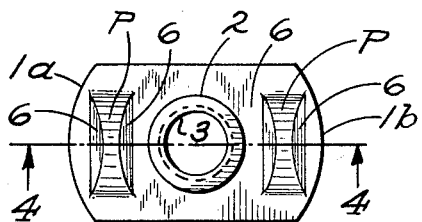
Figure 1 is a plan view of one of my improved weld nuts, looking at the face thereof from which the pilot and welding projections extend.
Figure 2:
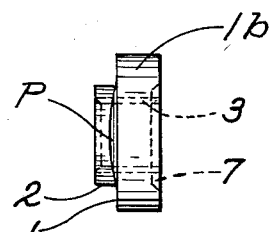
Figure 2 is an end elevation of the nut shown in Figure 1.

As is also seen in Figure 1, substantially flat converging side face portions 6 are preferably provided along the long edges of the projections P. To facilitate forming the projections P from flat stock elongated grooves 7 are formed in the opposite face of body 1, these recesses having outwardly flaring side walls and being disposed directly opposite and in alignment with the projections on the other side of the body.

The width of the projections P, where they meet the face of body portion 1, is substantially uniform throughout the length of the projections and this width, as seen in Figure 1, is preferably equal to or greater than the shortest distance of the inner edge of the projection from the outer wall of the pilot portion 2. Also, the overall length of the projections P is preferably not less than twice their overall width and, as illustrated, is substantially equal to the diameter of the pilot P. By this arrangement and form of welding projections an effective weld can be obtained with a nut which is relatively narrow as compared to its length and which requires a minimum of stock for a given size of threaded aperture.

The transversely extending elongated welding projections P, curved on their outer faces in both longitudinal and transverse directions, provide proper support for the weld nut on the sheet metal member 5 prior to and during welding, it being understood that to effect welding one electrode is placed against the upper face of the support member 5 and the other electrode against the lower face of the weld nut body 1 and suitable current and pressure applied whereby the welding projections P are fused and welded to the sheet 5 so that the upper (Figure 6) face of the body 1, from which the pilot member 2 extends, substantially abuts the adjacent surface of the supporting member 5. As seen in Figure 1, the ends 1$^a$ and 1$^b$ of body member 1 are preferably rounded off thus further reducing the overall size of the finished weld nut.

Figure 7:
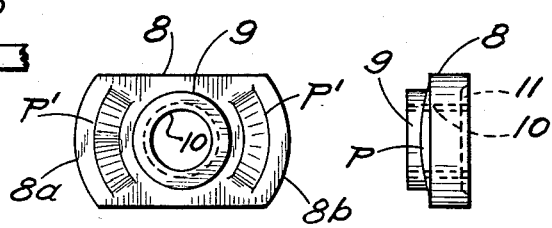
Figure 7 is a plan view generally similar to Figure 1 but illustrating a modified form of my improved weld nut, and Figure 8 in an end elevation of the weld nut shown in Figure 7.
Figure 8:
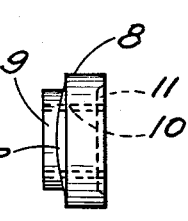

In Figures 7 and 8 I have illustrated a modified form of my improved weld nut in which the body member 8 has a pilot portion 9 extending from one face thereof and surrounding the threaded hole 10. In this weld nut the welding projections P' are curved or arcuate in their longitudinal form, the side edges thereof being concentric with the center of the threaded hole 10 and pilot 9. The body 8 is recessed at 11 opposite each of the curved projections P' for the reasons explained in referring to the recesses 7 of the nut of Figure 1, and the outer surface of the arcuate projections P' are curved longitudinally and transversely in the same general manner as described in discussing Figures 1–6. The ends 8$^a$ and 8$^b$ of the nut of Figures 7 and 8 are also curved and parallel to the outer edges of the projections P'. By means of the elongated arcuate welding projections P', symmetrically disposed on opposite sides of the pilot 9 and extending transversely of the longitudinal axis of the body 8, the overall dimensions of the weld nut may be still further reduced while maintaining the required strength for a given size threaded aperture. The relatively small overall size of my improved weld nuts not only effects a substantial saving in the cost of material involved but also makes possible the installation of a nut of a given size threaded aperture in locations where prior nuts with the same size threaded aperture but of larger overall dimensions could not be employed.

Although I have described the illustrated ambodiments of my improved weld nut in considerable detail it will be understood that variations and modifications may be made in the specific form and proportions of the elements thereof without departing from the spirit of my invention. I do not therefore wish to be limited to the specific items herein shown and described but claim as my invention all embodiments thereof coming within the scope of the appended claims.

I claim:

1. A weld nut comprising an elongated body member having a threaded aperture extending thereinto and centered on the longitudinal axis of said body member midway between the ends thereof, a pilot portion in the form of an annular flange projecting from one face of said body member and concentric with said aperture, and a pair of elongated welding projections projecting from said face and extending transversely across said longitudinal axis of said body member equidistant from the center of said threaded aperture, said projections having their outer surfaces convexly curved on different radii in longitudinal and transverse directions, the radius of curvature of the outer surface of said projections in longitudinal direction being greater that the radius of curvature of said outer surface in transverse direction.

2. A weld nut comprising an elongated body member having a threaded aperture extending thereinto and centered on the longitudinal axis of said body member midway between the ends thereof, a pilot portion in the form of an annular flange projecting from one face of said body member and concentric with said aperture, and a pair of elongated welding projections projecting from said face and extending transversely across said longitudinal axis of said body member equidistant from the center of said threaded aperture, said projections having their outer surfaces convexly curved on different radii in longitudinal and transverse directions and having converging substantially flat side face portions along their long edges.

3. A weld nut comprising an elongated body member having a threaded aperture extending thereinto and centered on the longitudinal axis of said body member midway between the ends thereof, a pilot portion in the form of an annular flange projecting from one face of said body member and concentric with said aperture, and a pair of elongated welding projections projecting from said face and extending transversely across said longitudinal axis of said body member equidistant from the center of said threaded aperture, said projections having their outer surfaces convexly curved on different radii in longitudinal and transverse directions, the width of each of said projections on said longitudinal axis of said body member being equal to or greater than the shortest distance from the inner edges of said projections to said pilot portion, and the overall length of said projections being not less than twice their overall width.

References Cited in the file of this patent

UNITED STATES PATENTS

| | | |
|---|---|---|
| 2,069,008 | Howard | June 26, 1937 |
| 2,286,667 | Brooke | June 16, 1942 |
| 2,336,791 | Barre | Dec. 14, 1943 |
| 2,372,772 | Ellis | Apr. 3, 1945 |
| 2,385,991 | Huntoon | Oct. 2, 1945 |
| 2,784,758 | Rohe | Mar. 12, 1957 |

FOREIGN PATENTS

| | | |
|---|---|---|
| 647,312 | Great Britain | Dec. 13, 1950 |
| 702,254 | Great Britain | Jan. 13, 1954 |